US011688991B2

United States Patent
Morello et al.

(10) Patent No.: US 11,688,991 B2
(45) Date of Patent: Jun. 27, 2023

(54) ELECTRICAL CONNECTOR ASSEMBLY AND METHOD OF MANUFACTURING SAME USING AN ADDITIVE MANUFACTURING PROCESS

(71) Applicant: Aptiv Technologies Limited, St. Michael (BB)

(72) Inventors: John R. Morello, Warren, OH (US); James M. Rainey, Warren, OH (US); Gerald Rhinehart, Jr., Lordstown, OH (US)

(73) Assignee: APTIV TECHNOLOGIES LIMITED, St. Michael (BB)

( * ) Notice: Subject to any disclaimer, the term of this patent is extended or adjusted under 35 U.S.C. 154(b) by 198 days.

(21) Appl. No.: 17/344,498

(22) Filed: Jun. 10, 2021

(65) Prior Publication Data

US 2022/0399692 A1 Dec. 15, 2022

(51) Int. Cl.
*H01R 43/18* (2006.01)
*B33Y 80/00* (2015.01)
*H01R 13/432* (2006.01)

(52) U.S. Cl.
CPC ............ *H01R 43/18* (2013.01); *B33Y 80/00* (2014.12); *H01R 13/432* (2013.01)

(58) Field of Classification Search
CPC ............................ H01R 43/18; H01R 13/432
USPC ....................................................... 439/625
See application file for complete search history.

(56) References Cited

U.S. PATENT DOCUMENTS

| 5,512,790 | A  | * | 4/1996 | Lachenmaier | H01L 24/49 200/11 DA |
| 7,476,127 | B1 | * | 1/2009 | Wei | H01R 24/54 439/583 |
| 8,814,601 | B1 | * | 8/2014 | Sherrer | H01R 24/50 29/852 |
| 9,595,795 | B2 | * | 3/2017 | Lane | H01R 13/6456 |
| 9,716,345 | B2 | * | 7/2017 | Watkins | H01R 13/6582 |

(Continued)

FOREIGN PATENT DOCUMENTS

| DE | 202020106100 U1 | 11/2020 |
| JP | 2016206149 A | 12/2016 |
| KR | 20190060575 A | 6/2019 |

OTHER PUBLICATIONS

Extended European Search Report from EP Application No. 22170520.5, dated Sep. 13, 2022, 11 pages.

(Continued)

*Primary Examiner* — Alexander Gilman
(74) *Attorney, Agent, or Firm* — Billion & Armitage

(57) ABSTRACT

An electrical connector is presented herein. The electrical connector includes an insulator that is formed of a dielectric material and defines a cavity extending therethrough. The cavity has a plurality of cylindrical sections. A first cylindrical section of the plurality of cylindrical sections has a diameter that is larger than a diameter of adjoining second and third cylindrical sections of the plurality of cylindrical sections on each side of the first cylindrical section. The insulator is preferably formed using an additive manufacturing process, such as stereolithography, digital light processing, fused deposition modeling, fused filament fabrication, selective laser sintering, selecting heat sintering, multi-jet modeling, multi-jet fusion, electronic beam melting, laminated object manufacturing, or 3D printing.

20 Claims, 4 Drawing Sheets

(56) References Cited

U.S. PATENT DOCUMENTS

| | | | | |
|---|---|---|---|---|
| 10,181,692 B2* | 1/2019 | Flaherty, IV | .......... | H01R 4/304 |
| 10,374,364 B2* | 8/2019 | Watkins | ............. | H01R 13/6582 |
| 10,622,732 B2* | 4/2020 | Youtsey | ............. | H01R 13/6581 |
| 10,644,421 B2* | 5/2020 | Smoll | ................ | H01R 13/6477 |
| 2008/0200066 A1* | 8/2008 | Hofling | ................ | H01R 13/432 |
| | | | | 439/578 |
| 2013/0008711 A1* | 1/2013 | Toyama | ................... | H02G 3/30 |
| | | | | 174/70 R |
| 2015/0180183 A1* | 6/2015 | Watkins | ............. | H01R 13/6584 |
| | | | | 439/578 |
| 2015/0226700 A1* | 8/2015 | Rondano | ................ | G01N 27/30 |
| | | | | 123/468 |
| 2016/0164232 A1* | 6/2016 | Lane | ...................... | H01R 24/50 |
| | | | | 439/578 |
| 2016/0301173 A1* | 10/2016 | Chawgo | ............. | H01R 43/0486 |
| 2017/0033474 A1* | 2/2017 | Erkamp | ................. | H01R 24/58 |
| 2018/0003910 A1* | 1/2018 | Menguy | ............. | G02B 6/02395 |
| 2018/0281857 A1* | 10/2018 | Choi | ..................... | B60W 10/20 |
| 2020/0006878 A1* | 1/2020 | Smoll | ................ | H01R 13/6477 |
| 2021/0010890 A1* | 1/2021 | Erkocak | ................ | G01L 19/0084 |
| 2021/0036471 A1* | 2/2021 | Nikfal | ................ | H01R 13/6477 |
| 2021/0080667 A1* | 3/2021 | Larson | ................. | G02B 6/3825 |
| 2021/0094071 A1* | 4/2021 | Yamada | ............. | G10K 9/125 |
| 2021/0218312 A1* | 7/2021 | Motoda | ................ | H01R 4/5075 |
| 2022/0399692 A1* | 12/2022 | Morello | ................ | H01R 43/18 |

OTHER PUBLICATIONS

Extended European Search Report for EP Application No. 22166620.9 dated Sep. 20, 2022 10 pages.

* cited by examiner

ELECTRICAL CONNECTOR ASSEMBLY AND METHOD OF MANUFACTURING SAME USING AN ADDITIVE MANUFACTURING PROCESS

This patent application is directed to an electrical connector assembly and a method of manufacturing such an electrical connector assembly using an additive manufacturing process.

BACKGROUND

Electrical insulators that are configured to house electrical terminals have typically been formed of plastic insulative materials using an injection molding process. The geometry of the features of the insulator, especially the internal features within the terminal cavities are limited by the requirements of the injection molding process. For example, it is difficult or impossible to have a one-piece insulator with an internal cavity section that has a larger diameter than two adjoining cavity sections because the features in the molding dies required to create the cavity cannot be withdrawn from the cavity once the plastic which is injected into the die hardens.

SUMMARY

According to one or more aspects of the present disclosure, an electrical connector includes an insulator formed of a dielectric material and defining a cavity extending therethrough. The cavity has a plurality of cylindrical sections. A first cylindrical section of the plurality of cylindrical sections has a diameter larger than a diameter of adjoining second and third cylindrical sections of the plurality of cylindrical sections on each side of the first cylindrical section.

In one or more embodiments of the electrical connector according to the previous paragraph, the cavity has a frustoconical section.

In one or more embodiments of the electrical connector according to any one of the previous paragraphs, the insulator has bilateral symmetry about a plane extending along a longitudinal axis of the insulator.

In one or more embodiments of the electrical connector according to any one of the previous paragraphs, the insulator defines a passage extending from a side wall of the cavity to an outer wall of the insulator.

In one or more embodiments of the electrical connector according to any one of the previous paragraphs, the passage is defined on an end of the insulator.

In one or more embodiments of the electrical connector according to any one of the previous paragraphs, the insulator and the cavity is formed using an additive manufacturing process.

In one or more embodiments of the electrical connector according to any one of the previous paragraphs, the additive manufacturing process is selected from a list consisting of stereolithography, digital light processing, fused deposition modeling, fused filament fabrication, selective laser sintering, selecting heat sintering, multi-jet modeling, multi-jet fusion, electronic beam melting, laminated object manufacturing, and 3D printing.

In one or more embodiments of the electrical connector according to any one of the previous paragraphs, the insulator has a plurality of cylindrical shaped portions having different diameters.

In one or more embodiments of the electrical connector according to any one of the previous paragraphs, the insulator has a frustoconical shaped portion.

In one or more embodiments of the electrical connector according to any one of the previous paragraphs, the cavity is configured to receive and retain an electrical terminal within.

In one or more embodiments of the electrical connector according to any one of the previous paragraphs, the cavity and the electrical terminal are configured to cooperatively receive and retain the electrical terminal within the cavity in any angular orientation relative to a longitudinal axis of the insulator.

In one or more embodiments of the electrical connector according to any one of the previous paragraphs, the electrical connector further includes the electrical terminal disposed within the cavity and a generally cylindrical shield terminal, wherein the insulator is disposed within the shield terminal.

According to one or more aspects of the present disclosure, a method of manufacturing an electrical connector includes the steps of: forming an insulator formed from a dielectric material using an additive manufacturing process and forming a cavity extending through the insulator using the additive manufacturing process. The cavity has a plurality of cylindrical sections formed using the additive manufacturing process. A first cylindrical section of the plurality of cylindrical sections has a diameter larger than a diameter of adjoining second and third cylindrical sections of the plurality of cylindrical sections on each side of the first cylindrical section.

In one or more embodiments of the method according to the previous paragraph, the method further includes the step of forming a frustoconical section in the cavity using the additive manufacturing process.

In one or more embodiments of the method according to any one of the previous paragraphs, the method further includes the step of forming a passage extending from a side wall of the cavity to an outer wall of the insulator using the additive manufacturing process.

In one or more embodiments of the method according to any one of the previous paragraphs, the passage is defined on an end of the insulator.

In one or more embodiments of the method according to any one of the previous paragraphs, the additive manufacturing process is selected from a list consisting of stereolithography, digital light processing, fused deposition modeling, fused filament fabrication, selective laser sintering, selecting heat sintering, multi-jet modeling, multi-jet fusion, electronic beam melting, laminated object manufacturing, and 3D printing.

In one or more embodiments of the method according to any one of the previous paragraphs, the insulator has bilateral symmetry about a plane extending along a longitudinal axis of the insulator. The method further includes the steps of disposing an electrical terminal within the cavity and retaining the electrical terminal within the cavity in any angular orientation relative to a longitudinal axis of the insulator.

According to one or more aspects of the present disclosure, an electrical connector assembly includes an insulator formed of a dielectric material and defining a cavity extending therethrough. The cavity has a plurality of cylindrical sections and wherein a first cylindrical section of the plurality of cylindrical sections has a diameter larger than a diameter of adjoining second and third cylindrical sections of the plurality of cylindrical sections on each side of the first cylindrical section. The electrical connector assembly includes an electrical terminal disposed within the cavity. The insulator includes means for retaining the electrical terminal within the cavity in any angular orientation relative to a longitudinal axis of the insulator.

DESCRIPTION OF THE DRAWINGS

The present invention will now be described, by way of example with reference to the accompanying drawings, in which.

DETAILED DESCRIPTION

An electrical connector having an insulator configured to contain an electrical terminal is described herein. The insulator is formed of a dielectric material, such as an engineered plastic. The insulator defines a cavity that is configured to retain and hold the electrical terminal within the insulator. The cavity extends longitudinally from one end of the insulator to the other and is oriented parallel to a longitudinal axis of the insulator. The cavity has a plurality of cylindrical sections of differing diameter. A first cylindrical section has a diameter that is larger than a diameter of adjoining second and third cylindrical sections of the cavity on each side of the first cylindrical section. The cavity may be formed such that the first cylindrical section has a larger diameter than the adjoining second and third cylindrical sections on each side of the first cylindrical section by using an additive manufacturing process to form the cavity. Examples of the additive manufacturing processes that may be employed to manufacture the insulator include: stereolithography, digital light processing, fused deposition modeling, fused filament fabrication, selective laser sintering, selecting heat sintering, multi-jet modeling, multi-jet fusion, electronic beam melting, laminated object manufacturing, and 3D printing.

FIGS. 1-4 show a particular example of a generally cylindrical insulator 10 used within a shield terminal (not shown) of a coaxial shielded electrical connector to electrically insulate a central signal terminal 12 from the shield terminal. This insulator 10 has the advantage of being small enough that up to 1000 insulators may be produced at one time using existing additive manufacturing processes which makes it cost competitive with insulators for shielded electrical connectors produced using conventional injection molding processes.

Figure 1:
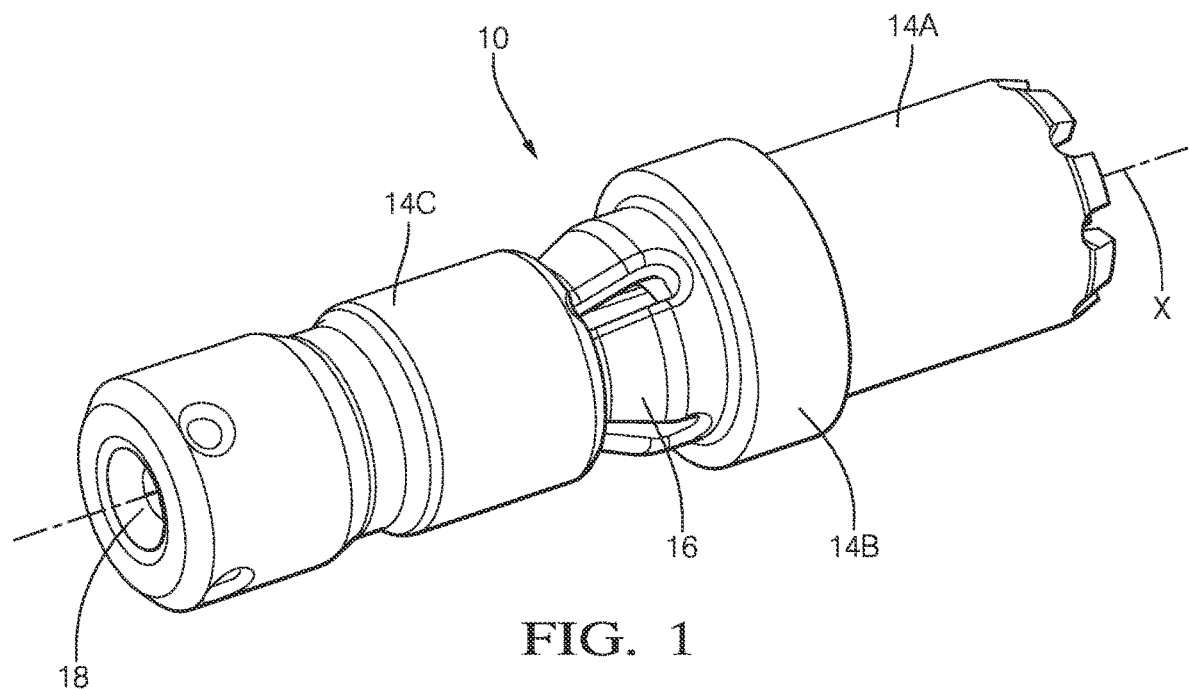
FIG. 1 is a perspective view of an electrical insulator according to some embodiments.
Figure 2:
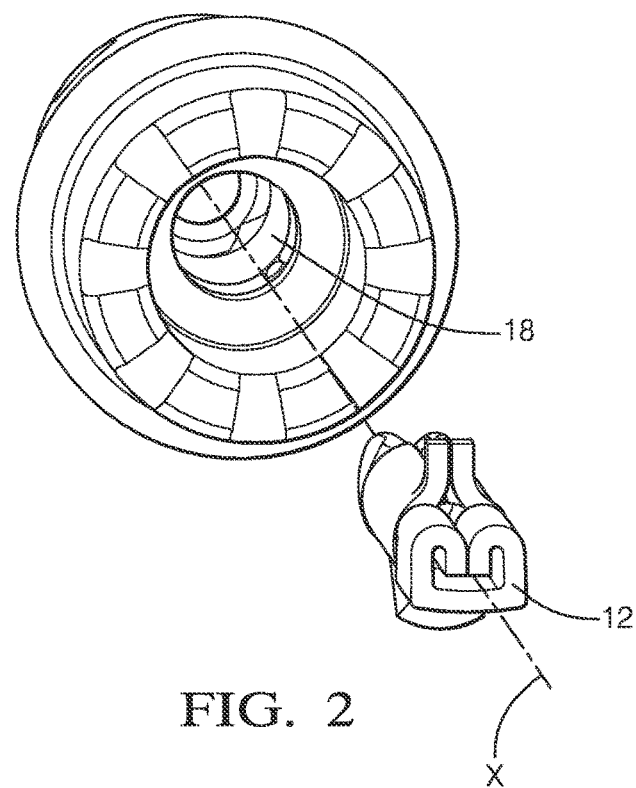
FIG. 2 is an exploded view of the electrical insulator of FIG. 1 and an electrical terminal according to some embodiments.

As best shown in FIG. 1, the outer surface of the insulator 10 has a plurality of cylindrical shaped portions 14A, 14B, 14C having different diameters. The outer surface of the insulator also has a frustoconical shaped portion 16. The insulator defines a cavity 18 that is configured to retain and hold the signal terminal 12 within the interior of the insulator 10. The cavity 18 extends longitudinally from one end of the insulator 10 to the other and is oriented parallel with, or coaxial to, a longitudinal axis X of the insulator 10. The cavity 18 has a plurality of cylindrical sections 20A, 20B, 20C, 20D of differing diameter. The insulator 10 defines a plurality of passages 22 extending from the cavity 18 to an outer surface of the insulator 10. During the manufacturing process, these passages 22 serve as drains and/or vents to allow cleaning fluids using in the manufacturing process to exit the cavity 18. Some of the passages 22 are arranged on one end of the insulator 10 where the insulator 10 meets the deposition platform (not shown) during the additive manufacturing process, thereby serving a drain for the cleaning fluids. As shown in FIG. 2, the "teeth" 24 between these passages 22 on the end of the insulator 10 may also serve as crush ribs to secure the insulator 10 within the shield terminal. These passages 22 may also be placed in specific locations in the insulator 10 to tune the electrical capacitance between the signal terminal 12 and the shield terminal in order to improve the radio frequency performance of the connector assembly.

Figure 3:
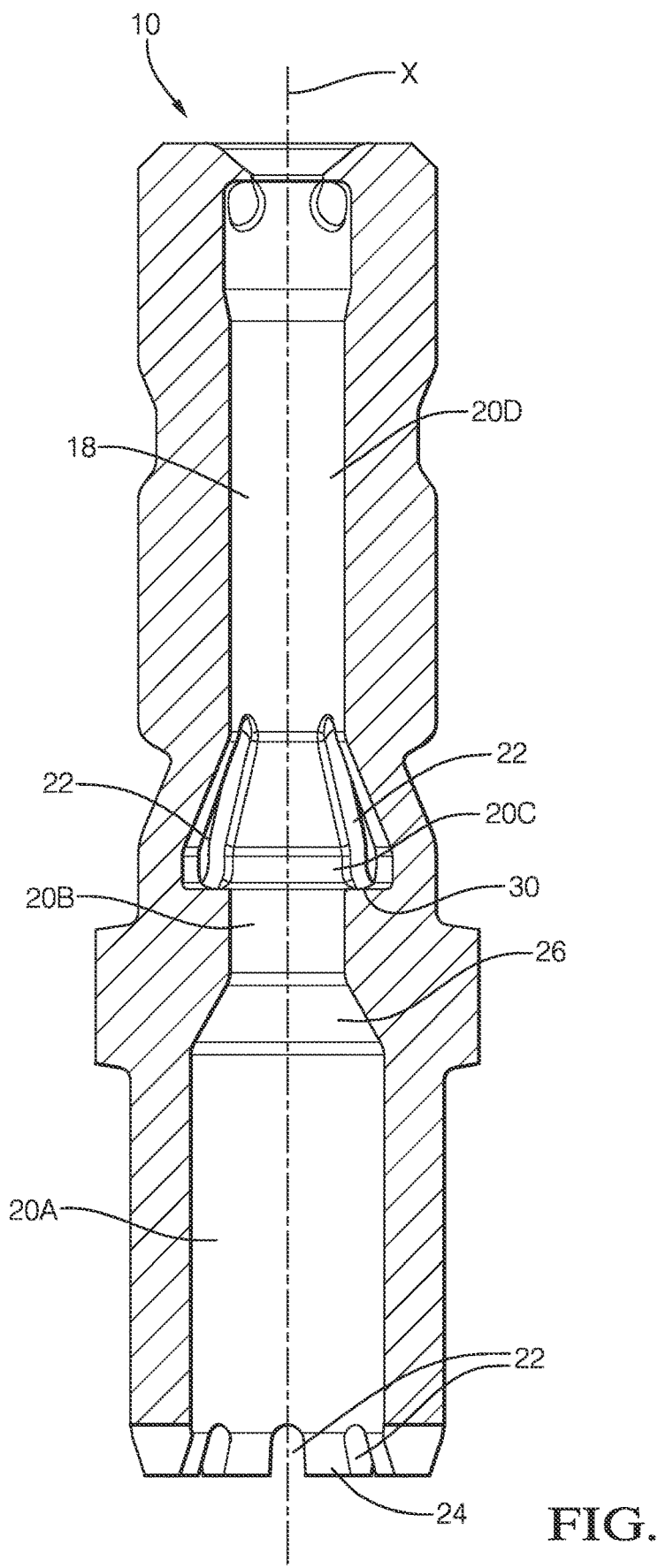
FIG. 3 is a cross section side view of the electrical insulator of FIG. 1 according to some embodiments.

As illustrated in FIG. 3, the cavity 18 within the insulator 10 has various cylindrical sections 20A, 20B, 20C, 20D that are larger than the adjoining sections 20B, 20D. One cylindrical section 20C of the cavity 18 cooperates with a resilient cantilevered locking tang feature 28 on the signal terminal 12 to retain the signal terminal 12 within the cavity 18. In the illustrated example of FIG. 4, the locking tang feature 28 projects at an acute angle relative to the longitudinal axis X, when it is inserted within the cavity 18. As the signal terminal 12 is pushed into the cavity 18, it passes through the first cylindrical section 20A and the second cylindrical section 20B which has a diameter that is less than the first cylindrical section 20A. There is a frustoconical section 26 of the cavity 18 located between the first cylindrical section 20A and the second cylindrical section 20B. As the terminal 12 passes through the frustoconical section 26, the locking tang feature 28 is compressed so that it may fit through the smaller second cylindrical section 20B.

Figure 4:
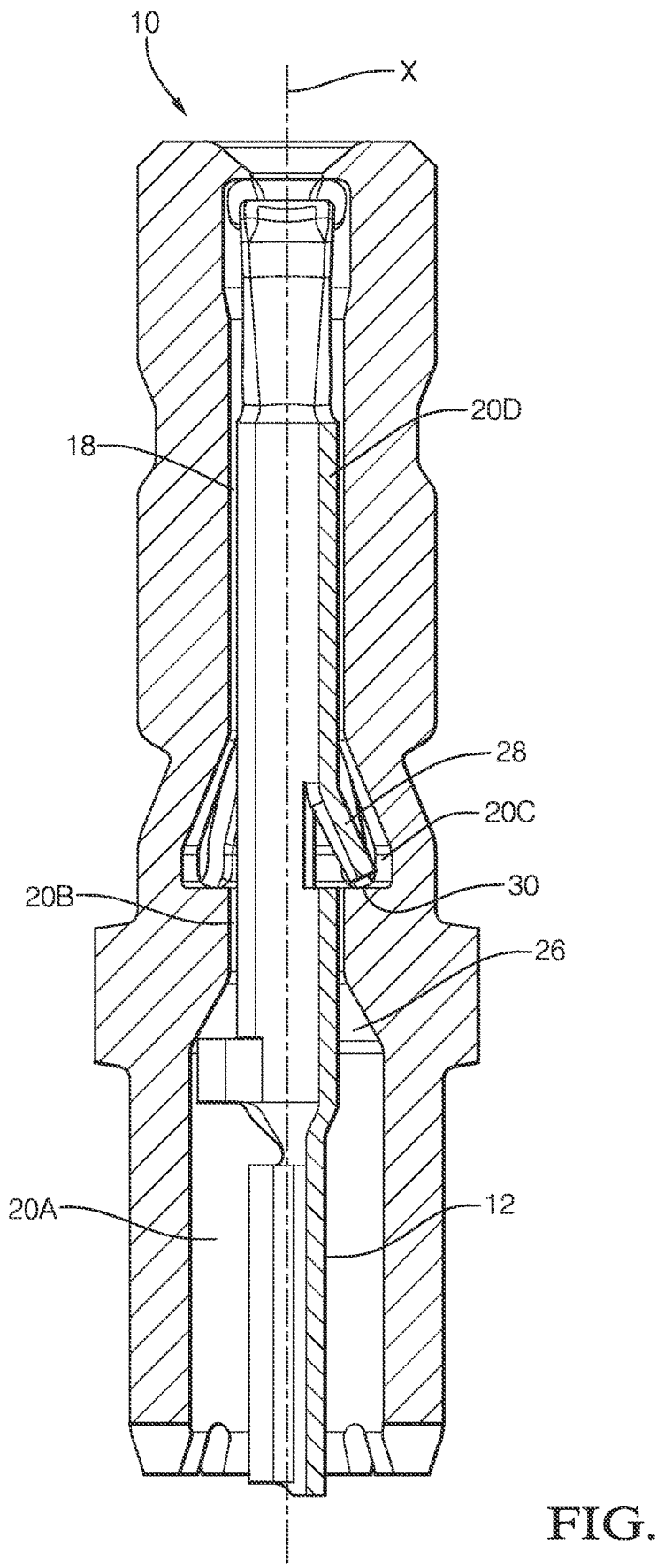
FIG. 4 is a cross section side view of the electrical insulator of FIG. 1 with the electrical terminal of FIG. 2 disposed within the cavity according to some embodiments.

Without subscribing to any particular theory of operation, after passing through the frustoconical section 26, the locking tang feature 28 of the signal terminal 12 enters a third cylindrical section 20C of the cavity 18 which has a larger diameter than the second cylindrical section 20B. once inside the third cylindrical section 20C, the locking tang feature 28 returns to its original uncompressed shape. As shown in FIG. 4, the locking tang feature 28 engages the wall 30 of the third cylindrical section 20C adjacent the frustoconical section 26 and inhibits removal of the signal terminal 12 from the cavity 18. The terminal 12 also defines a projection 32 that extends laterally, i.e., perpendicularly the longitudinal axis X, that is disposed within the first cylindrical section 20A. This projection 32 cooperates with the locking tang feature 28 to locate the terminal within the cavity.

Since the first, second, and third cylindrical sections 20A-20C and the frustoconical section 26 of the cavity 18 are symmetrical about the longitudinal axis X, the signal terminal 12 may be inserted and retained within the insulator 10 at any angular orientation relative to a longitudinal axis X of the insulator 10. This is particularly beneficial when the small size of the insulator 10 and signal terminal 12 make it difficult to align a terminal retention feature in a particular orientation.

While the illustrated example is directed to an insulative insulator 10 in a shielded coaxial connector, other embodiments of this invention may be containing in other connector types, e.g., an insulative multi-cavity connector body.

Figure 5:
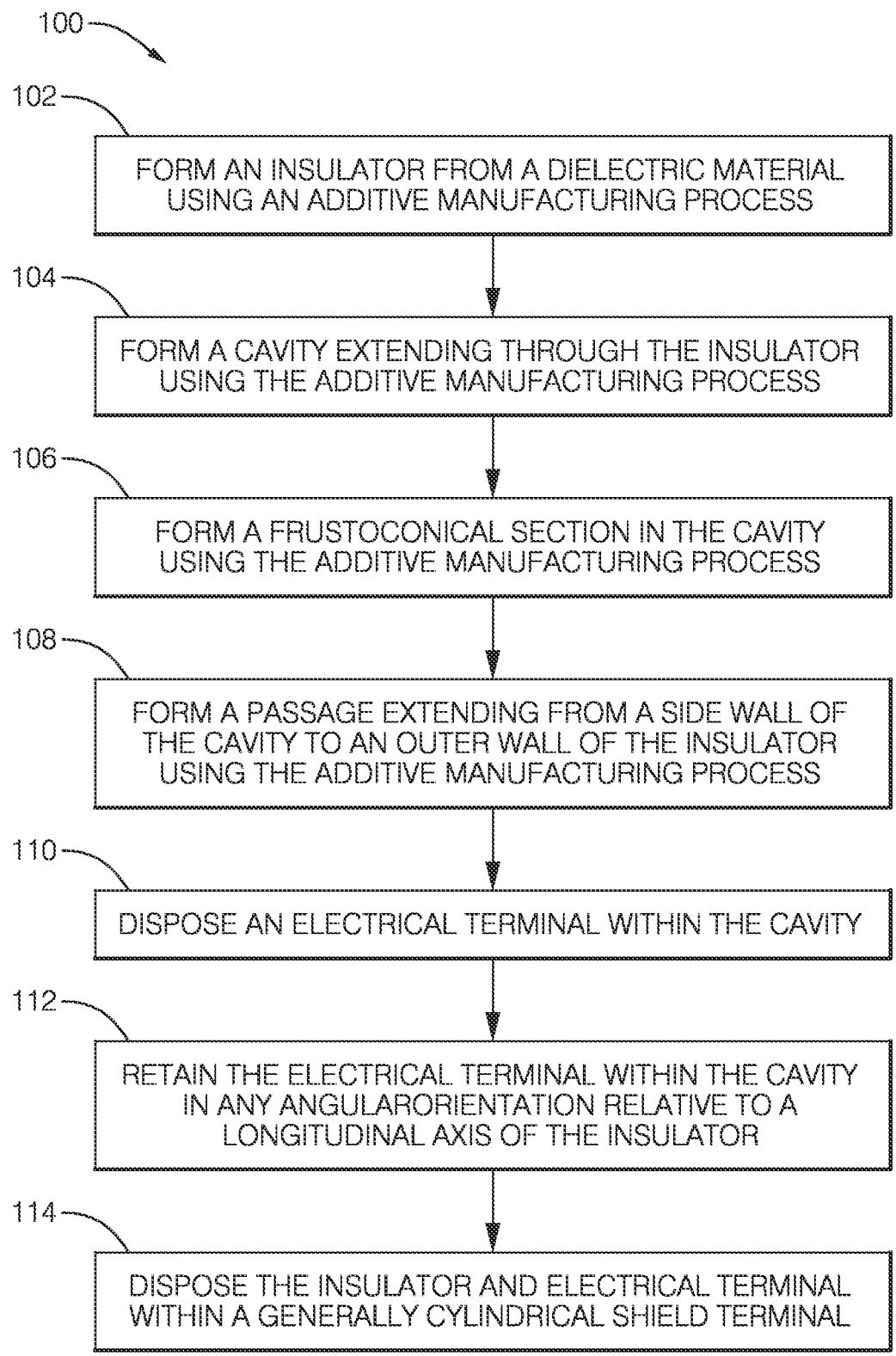
FIG. 5 is a flow chart of a method of manufacturing an electrical connector assembly according to some embodiments.

FIG. 5 shows a flow chart of a method 100 of forming the electrical connector described above. The method 100 includes the steps of:

STEP 102, FORM AN INSULATOR FROM A DIELECTRIC MATERIAL USING AN ADDITIVE MANUFACTURING PROCESS, includes forming an insulator 10 from a dielectric material using an additive manufacturing process, e.g., the additive manufacturing process is selected from a list consisting of stereolithography, digital light processing, fused deposition modeling, fused filament fabrication, selective laser sintering, selecting heat sintering, multi-jet modeling, multi-jet fusion, electronic beam melting, laminated object manufacturing, or 3D printing;

STEP 104, FORM A CAVITY EXTENDING THROUGH THE INSULATOR USING THE ADDITIVE MANUFACTURING PROCESS, includes forming a cavity 18 extending through the insulator 10 using the additive manufacturing process. The cavity 18 has a plurality of cylindrical sections 20A-20D formed using the additive manufacturing process. One cylindrical section 20C of the plurality of cylindrical sections has a diameter larger than a diameter of adjoining sections 20B, 20D on each side of the cylindrical section 20C;

STEP 106, FORM A FRUSTOCONICAL SECTION IN THE CAVITY USING THE ADDITIVE MANUFACTURING PROCESS, includes forming a frustoconical section 26 in the cavity using the additive manufacturing process;

STEP 108, FORM A PASSAGE EXTENDING FROM A SIDE WALL OF THE CAVITY TO AN OUTER WALL OF THE INSULATOR USING THE ADDITIVE MANUFACTURING PROCESS, includes forming a passage 24 extending from a side wall of the cavity 18 to an outer wall of the insulator 10 using the additive manufacturing process. The passage may be defined on an end of the insulator 10 and form a dentation pattern;

STEP 110, DISPOSE AN ELECTRICAL TERMINAL WITHIN THE CAVITY, includes disposing an electrical terminal 12, such as a central signal terminal, within the cavity 18;

STEP 112, RETAIN THE ELECTRICAL TERMINAL WITHIN THE CAVITY IN ANY ANGULAR ORIENTATION RELATIVE TO A LONGITUDINAL AXIS OF THE INSULATOR, includes retaining the electrical terminal 12 within the cavity 18 in any angular orientation relative to the longitudinal axis X of the insulator 10. This is possible due to the locking tang feature 28 on the terminal 12 and the insulator 10 having bilateral symmetry about a plane extending along a longitudinal axis X of the insulator; and STEP 114, DISPOSE THE INSULATOR AND ELECTRICAL TERMINAL WITHIN A GENERALLY CYLINDRICAL SHIELD TERMINAL, includes disposing the insulator 10 and electrical terminal 12 within a generally cylindrical shield terminal (not shown).

While the embodiment illustrated herein is directed to an insulator 10 for a shielded electrical connector, other embodiments may be envisioned in which the insulator is a connector body having a different shape which may contain multiple cavities aligned in linear, rectangular, or circular arrays.

Accordingly, an electrical connector and a method of manufacturing an electrical connector using an additive manufacturing process is provided. The electrical connector includes an insulator 10 that provides the benefit of receiving and retaining a terminal 12 when inserted within a cavity 18 in the insulator 10 in any angular orientation relative to a longitudinal axis X of the insulator 10. The passages 22 from the cavity 18 to the outer walls of the insulator 10 provide the benefits of allowing escape of cleaning fluids from the cavity 18 during the manufacturing process. The passages 22 may also provide the benefit of tuning the capacitance between a signal terminal 12 within the insulator 10 and a shield terminal surrounding the insulator 10 when the insulator 10 is used in a coaxial shielded electrical connector application. The method of additively manufacturing the insulator 10 also provides the benefit of being cost competitive with insulators manufactured with conventional injection molding techniques.

While the invention has been described with reference to an exemplary embodiment(s), it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention is not limited to the disclosed embodiment(s), but that the invention will include all embodiments falling within the scope of the appended claims.

The invention claimed is:

1. An electrical connector, comprising:
an insulator formed of a dielectric material and defining a cavity extending therethrough, wherein the cavity has a plurality of cylindrical sections including a first cylindrical section, a second cylindrical section, a third cylindrical section and a fourth cylindrical section, and wherein the second cylindrical section is disposed between the first and third cylindrical sections and has a second diameter smaller than a first diameter of the first cylindrical section, and wherein the third cylindrical section is disposed between the second and fourth cylindrical sections and has a third diameter larger than the second diameter of the second cylindrical section and a fourth diameter of the fourth cylindrical section, and wherein the cavity defines a frustoconical section located between the first cylindrical section and the second cylindrical section; and
an electrical terminal having a resilient cantilevered locking tang feature that projects at an acute angle relative to a longitudinal axis and is configured to retain the electrical terminal within the cavity, wherein the locking tang feature is compressed by the frustoconical section so that it may fit through the second cylindrical section as the electrical terminal is inserted within the cavity, and wherein the locking tang feature engages a wall of the third cylindrical section to inhibit removal of the electrical terminal from the insulator.

2. The electrical connector according to claim 1, wherein the locking tang feature is configured to return to its original uncompressed shape after the locking tang feature passes through the frustoconical section and enters the third cylindrical section.

3. The electrical connector according to claim 1, wherein the insulator has bilateral symmetry about a plane extending along a longitudinal axis of the insulator.

4. The electrical connector according to claim 1, wherein the insulator defines a passage extending from a side wall of the cavity to an outer wall of the insulator.

5. The electrical connector according to claim 4, wherein the passage is defined on an end of the insulator.

6. The electrical connector according to claim 1, wherein the insulator and the cavity is formed using an additive manufacturing process.

7. The electrical connector according to claim 6, wherein the additive manufacturing process is selected from a list consisting of stereolithography, digital light processing, fused deposition modeling, fused filament fabrication, selective laser sintering, selecting heat sintering, multi jet modeling, multi jet fusion, electronic beam melting, laminated object manufacturing, and 3D printing.

8. The electrical connector according to claim 1, wherein the insulator has a plurality of cylindrical shaped portions having different diameters.

9. The electrical connector according to claim 8, wherein the insulator has a frustoconical shaped portion.

10. The electrical connector according to claim 1, wherein the cavity is configured to receive and retain an electrical terminal within.

11. The electrical connector according to claim 10, wherein the cavity and the electrical terminal are configured to cooperatively receive and retain the electrical terminal within the cavity in any angular orientation relative to a longitudinal axis of the insulator.

12. The electrical connector according to claim 10, further comprising:
a generally cylindrical shield terminal, wherein the insulator is disposed within the shield terminal.

13. A method of manufacturing an electrical connector, comprising:
forming an insulator formed from a dielectric material using an additive manufacturing process; and
forming a cavity extending through the insulator using the additive manufacturing process, wherein the cavity includes a first cylindrical section, a second cylindrical section, a third cylindrical section and a fourth cylindrical section, and wherein the second cylindrical section is disposed between the first and third cylindrical sections and has a second diameter smaller than a first diameter of the first cylindrical section, and wherein the third cylindrical section is disposed between the second and fourth cylindrical sections and has a third diameter larger than the second diameter of the second cylindrical section and a fourth diameter of the fourth cylindrical section, and wherein the cavity defines a frustoconical section located between the first cylindrical section and the second cylindrical section;
inserting an electrical terminal into the first cylindrical section, wherein the electrical terminal having a resilient cantilevered locking tang feature that projects at an acute angle relative to a longitudinal axis and is configured to retain the electrical terminal within the cavity; and
compressing the locking tang feature as the electrical terminal is inserted within the cavity using the frustoconical section so that it may fit through the smaller second cylindrical section.

14. The method according to claim 13, further comprising:
returning the locking tang feature to its original uncompressed shape after the locking tang feature passes through the frustoconical section and enters the third cylindrical section.

15. The method according to claim 13, further comprising:
forming a passage extending from a side wall of the cavity to an outer wall of the insulator using the additive manufacturing process.

16. The method according to claim 15, wherein the passage is defined on an end of the insulator.

17. The method according to claim 13, wherein the additive manufacturing process is selected from a list consisting of stereolithography, digital light processing, fused deposition modeling, fused filament fabrication, selective laser sintering, selecting heat sintering, multi-jet modeling, multi-jet fusion, electronic beam melting, laminated object manufacturing, and 3D printing.

18. The method according to claim 13, wherein the insulator has bilateral symmetry about a plane extending along a longitudinal axis of the insulator and wherein the method further comprises:
disposing an electrical terminal within the cavity; and
retaining the electrical terminal within the cavity in any angular orientation relative to a longitudinal axis of the insulator.

19. The method according to claim 18, further comprising:
disposing the insulator and electrical terminal within a generally cylindrical shield terminal, wherein the cavity and the electrical terminal are configured to cooperatively receive and retain the electrical terminal within the cavity in any angular orientation relative to a longitudinal axis of the insulator.

20. An electrical connector assembly, comprising:
an insulator formed of a dielectric material and defining a cavity extending therethrough, wherein the cavity has a plurality of cylindrical sections, wherein a first cylindrical section of the plurality of cylindrical sections has a diameter larger than a diameter of adjoining second and third cylindrical sections of the plurality of cylindrical sections on each side of the first cylindrical section, and wherein the cavity defines a frustoconical section located between the first cylindrical section and the second cylindrical section; and
an electrical terminal disposed within the cavity, wherein the insulator includes means for retaining the electrical terminal within the cavity in any angular orientation relative to a longitudinal axis of the insulator, wherein the means for retaining the electrical terminal within the cavity is compressed by the frustoconical section so that it may fit through the smaller second cylindrical section as the electrical terminal is inserted within the cavity.

* * * * *